United States Patent
Allison et al.

[11] Patent Number: 6,050,628
[45] Date of Patent: Apr. 18, 2000

[54] GLOVE BOX FOR A VEHICLE

[75] Inventors: Johnny Hugh Allison, Plymouth; Gerald Arthur Heath, Canton, both of Mich.

[73] Assignee: Ford Motor Company, Dearborn, Mich.

[21] Appl. No.: 08/882,481

[22] Filed: Jun. 25, 1997

[51] Int. Cl.$^7$ ................................. B60N 3/00
[52] U.S. Cl. ............... 296/37.12; 224/281; 224/541; 312/319.1; 312/334.8; 384/35
[58] Field of Search ................ 296/37.9, 37.12; 312/319.1, 334.8, 334.16, 334.22; 384/20, 21, 35, 42; 224/281, 539, 541, 551

[56] References Cited

U.S. PATENT DOCUMENTS

| | | | |
|---|---|---|---|
| 2,265,927 | 12/1941 | Pratt | 312/334.8 |
| 2,275,060 | 3/1942 | Griffin | 224/281 |
| 2,277,703 | 3/1942 | Kennedy et al. | 312/334.8 X |
| 3,039,642 | 6/1962 | Perkins | 220/18 |
| 3,133,768 | 5/1964 | Klakovich | 312/334.8 X |
| 3,601,464 | 8/1971 | DeBoer et al. | 312/246 |
| 3,606,112 | 9/1971 | Cheshier | 224/42.44 |
| 4,596,416 | 6/1986 | Muller | 296/37.12 |
| 4,720,131 | 1/1988 | Grote | 296/37.9 |
| 5,004,306 | 4/1991 | Oshida | 312/319 |
| 5,065,920 | 11/1991 | Amner | 224/275 |
| 5,197,775 | 3/1993 | Reeber | 296/37.12 |
| 5,350,894 | 9/1994 | Allison | 200/549 |
| 5,466,060 | 11/1995 | Hoffman | 312/334.8 |
| 5,556,017 | 9/1996 | Troy | 224/549 |
| 5,626,405 | 5/1997 | Banks | 312/334.8 |

FOREIGN PATENT DOCUMENTS

| | | | |
|---|---|---|---|
| 3816407 | 11/1989 | Germany | 296/37.12 |
| 2-109754 | 4/1990 | Japan | B60R 7/06 |
| 4-166442 | 6/1992 | Japan | B60R 7/06 |
| 4-166444 | 6/1992 | Japan | B60R 7/06 |
| 0288066 | 5/1953 | Switzerland | 312/334.8 |

*Primary Examiner*—Russell D. Stormer
*Assistant Examiner*—Chad D. Wells
*Attorney, Agent, or Firm*—Roger L. May; David B. Kelley

[57] ABSTRACT

A glove box assembly (10) for a vehicle includes left and right side braces (50, 52) each having multiple sections (54, 64, 78). The first section (54) is fastened to the vehicle frame (24) and the second section (64) is connected to the first section and slidably movable relative to the first section between a retracted position at which the second section nests in the first section an extended position at which the second section extends from the first section. The third section (78) is connected to the second section (64) and slidably movable relative to the second section between a retracted position at which the third section nests in the second section an extended position at which the third section extends from the second section. A bin (28) is removably mounted between the left and right side braces (50, 52). The second and third sections (64, 78) of the braces (64, 78) are extended and retracted to controllably extend and retract the bin (28).

20 Claims, 5 Drawing Sheets

GLOVE BOX FOR A VEHICLE

FIELD OF THE INVENTION

The present invention relates to a glove box for an instrument panel of a vehicle.

BACKGROUND OF THE INVENTION

It is the practice in the design of the interiors of automobiles and other vehicles to provide a storage compartment, or glove box, in the vehicle's instrument panel on the side of the instrument panel opposite the driver's position for access by the driver or a passenger. The advent of inflatable air bags, redesign of ventilation systems, desire to more efficiently utilize vehicle space and other factors have combined to alter conventional construction of the glove box. Shifting the ventilation system ducts frees space for expanding the glove box by increasing its front to rear dimension. Unfortunately, the depth of the glove box makes reaching articles in the rear of the box difficult. Accordingly, it is desirable to have an expanded glove box in which all articles are easily accessible.

In vehicle manufacturing it is desirable to minimize the number of different components required to construct several vehicle models or versions. The conventional practice has been to construct a single glove box to fit the vehicle model with the least amount of space and also use it for other vehicles models even when more space was available. This practice does not fully utilize available space and is therefor undesirable. It is desirable to have a single glove box frame that accommodates bins of different depths to fully utilize space available in different models while minimizing the number of different components.

SUMMARY OF THE INVENTION

The present invention is directed to overcoming one or more of the problems set forth above. Briefly summarized, according to one aspect of the present invention, a glove box for a vehicle comprises left and right side braces each having multiple sections. The first section is fastened to the vehicle frame and the second section is connected to the first section and slidably movable relative to the first section between a retracted position at which the second section nests in the first section an extended position at which the second section extends from the first section. The third section is connected to the second section and slidably movable relative to the second section between a retracted position at which the third section nests in the second section and an extended position at which the third section extends from the second section. A bin is removably mounted between the left and right braces. The second and third sections of the braces are controllably extended and retracted to extend and retract the bin.

The bin moves straight out from the instrument panel and can be removed and replaced with another bin. Moving the bin straight out allows the bin to offer more usable space and a better view of the bin contents. The glove box offers a removable glove box bin that can take advantage of all the package space available. It is flexible because it adapts to differently designed or alternative use glove boxes. All articles are easily accessible because the bin slides out from the instrument panel. A single glove box frame can accommodate bins of different depths to fully utilize packaging space available in different models while minimizing the number of different components required to be inventoried.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
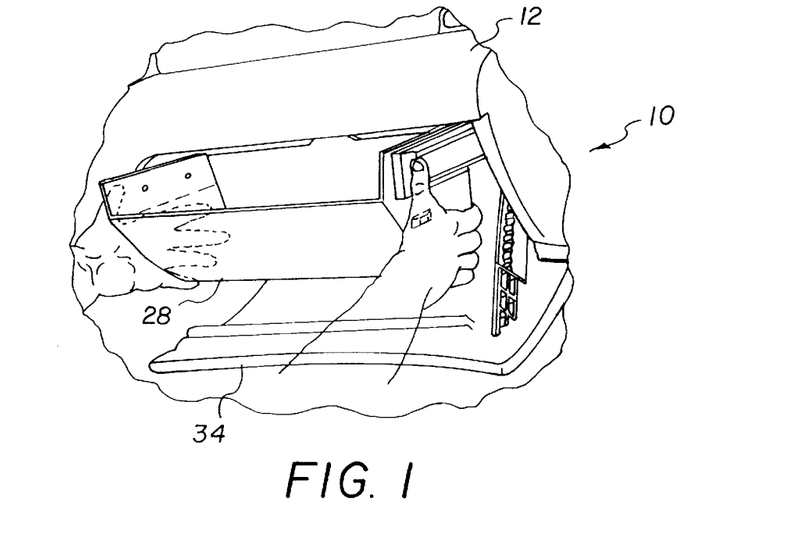
FIG. 1 is diagrammatic perspective view of a preferred embodiment of a glove box removably mounted in a brace in an instrument panel of a vehicle according to the present invention.
Figure 2:
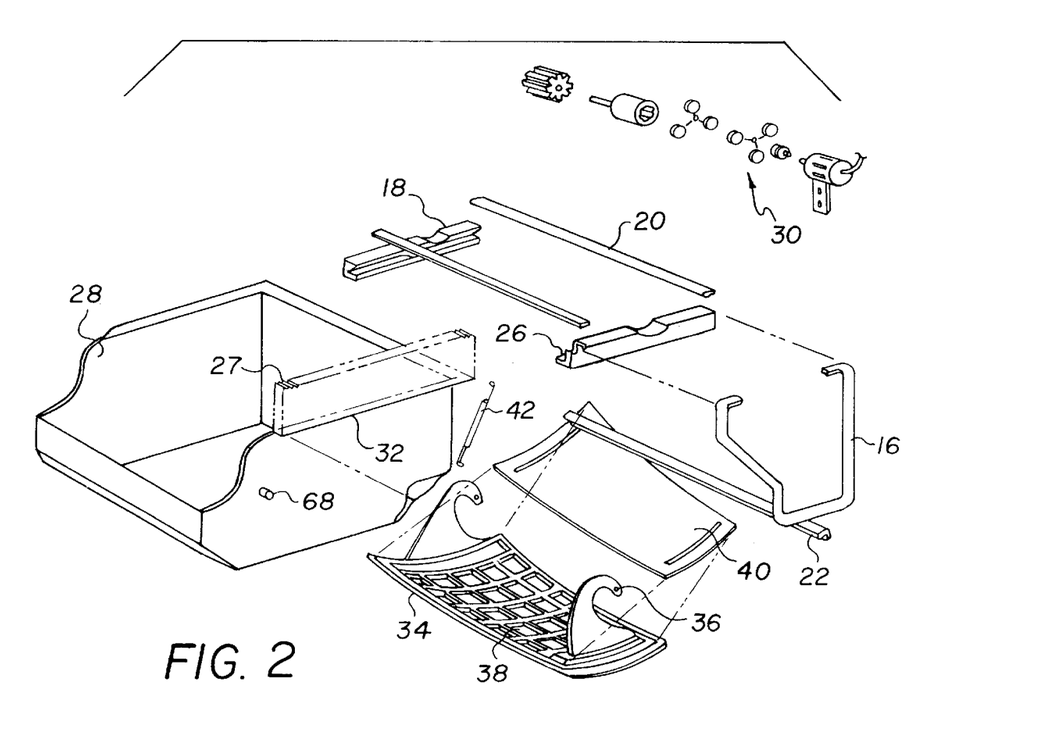
FIG. 2 is an exploded view of the glove box of FIG. 1
Figure 3:
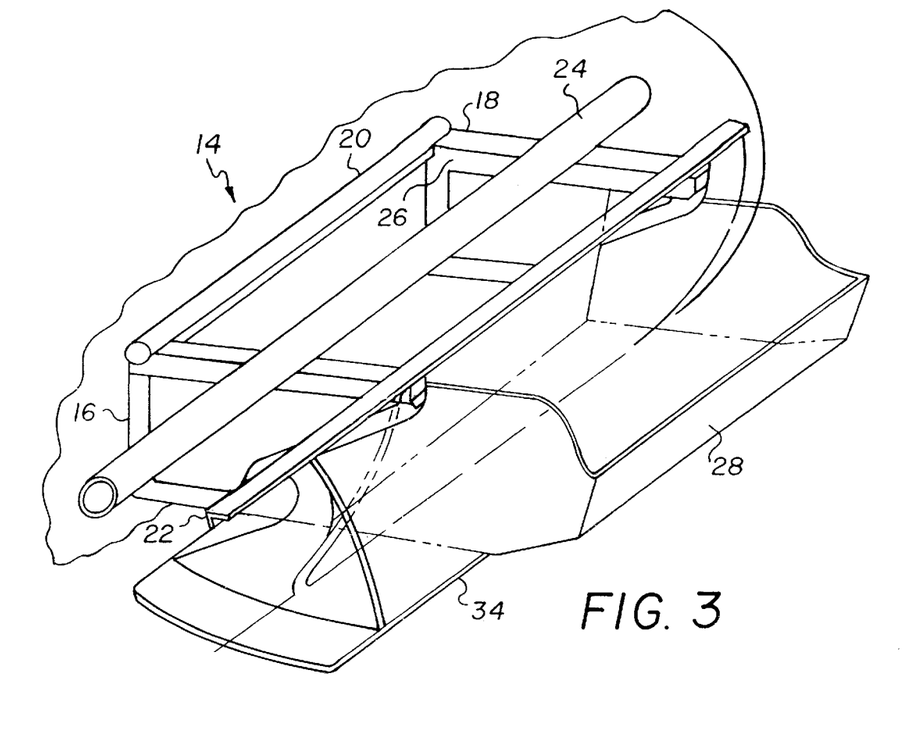
FIG. 3 is a diagrammatic perspective view of the glove box of FIG. 1.

Referring to FIGS. 1–3, a glove box 10 is positioned in the instrument panel housing 12. A glove box frame 14 contains two side frame members 16 that are attached at their tops to longitudinally extending track supports 18 that are connected by two top cross members 20 and a bottom cross member 22. The instrument panel housing 12 functions to act as a knee bolster along with the glove box frame 14. The track supports 18 are fastened to a vehicle frame cross member 24. Track supports 18 provide a gear track 26 under the lip of the track supports 18 for driving the glove box bin 28 in and out by a drive motor 30.

The glove box bin 28 is removable and preferably houses a set of lineural bearings in a flange 32 that facilitate easy movement of the bin 28 in and out. A gear track 27 can be molded in the upper side of the right bin flange or attached to the bin flange or fastened on the side of the bin. Track 27 engages a drive gear that is located on the outside of a gear box fastened to the drive motor 30. Drive motor 30 is preferably mounted on the side frame member 16. The gears used in the gear box is a gear system to achieve a high gear ratio, such as a 9:1 ratio for example, which allows the use of a small input to gain a high torque. This can be accomplished with a set of planetary gears and a small drive gear that comes directly off the motor. The drive gear can be on the inside of the first of a trio of planetary gears that ride on the outside, and a larger gear formed out of the inside wall of the gear housing. Using two sets of planetary gears and the inner wall as a gear and housing achieves a 9:1 torque rise or larger. The glove box bin 28 moves straight in and out and causes the glove box door 34 to swing under the instrument panel allowing the size of the glove box bin to be maximized. The gooseneck design of the door causes the door to swing under the instrument panel and out of the way of vehicle occupants The glove box door 34 has two gooseneck sidearms 36 that allow the glove box door to swing down under the bottom cross member 22. The glove box door can be braced to increase its strength and act as a knee bolster panel at all times. Glove box door 34 consists of a door inner panel 38 of honeycomb construction for strength and minimal weight. The two gooseneck sidearms 36 allow the door 34 to swing down under the bottom cross member 22. An inner trim panel 40 adds strength and aesthetic appeal while return springs 42 return the door to the closed position when the bin is retracted.

Figure 6:
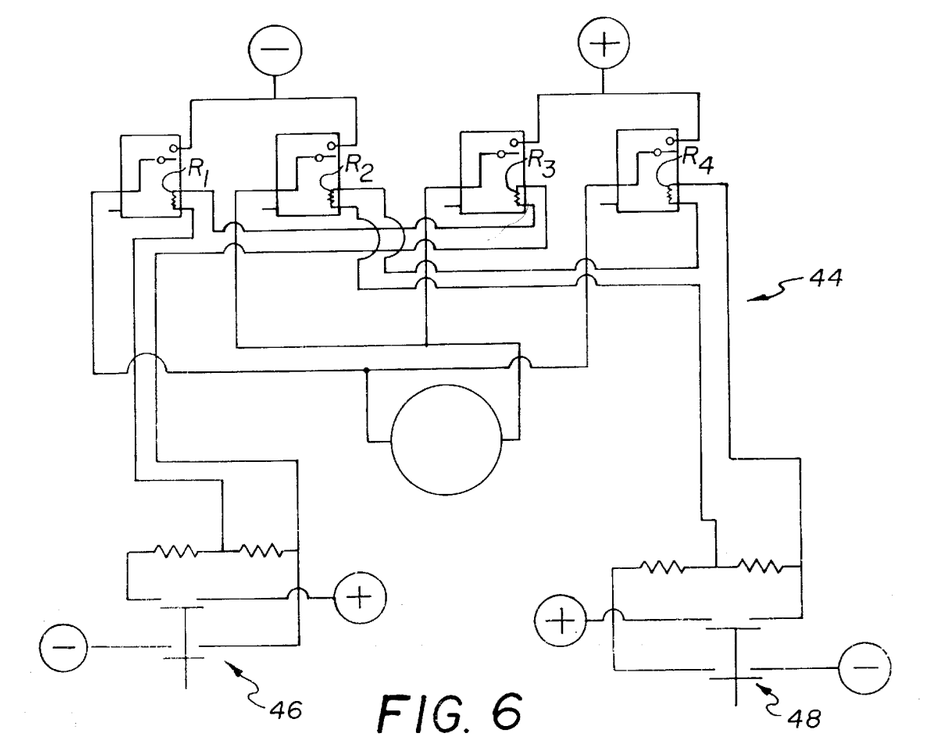
FIG. 6 is a schematic diagram of the control circuit for controlling the motor of FIG. 2.
Figure 7:
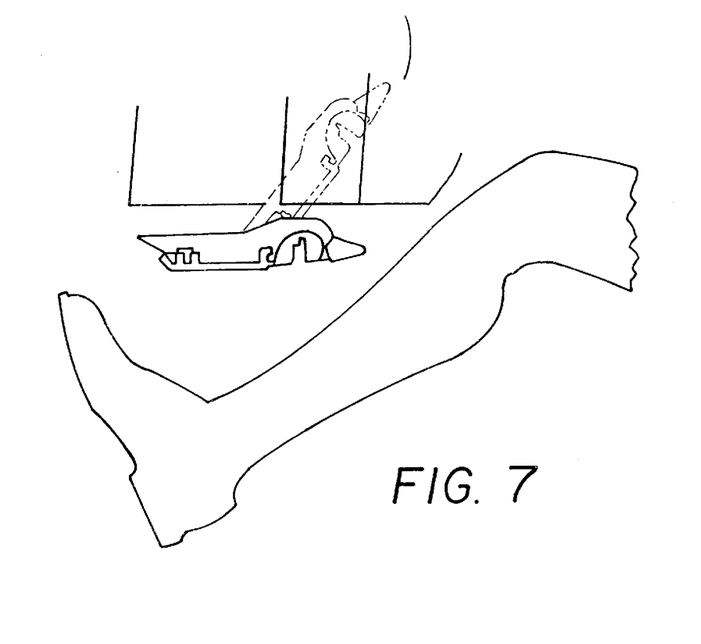
FIG. 7 illustrates the door of the glove box of FIG. 1 in its open position relative to the leg of a vehicle occupant.

Referring to FIG. 6, the motor 30 is controlled by a control circuit 44 containing push button switches 46, 48, or, alternatively, by a single dual acting rocker or push button switch. Pushing and holding push button switch 46 applies a power source across series connected resistors that form a voltage divider to apply the desired voltage. The divided voltage is routed to the relay coil for relay $R_1$ and to the relay coil for relay $R_3$. Relays $R_1$ and $R_3$ have normally open relay contacts that close when the divided voltage is applied to their relay coils. Energizing the relay coils operates relays $R_1$ and $R_3$ closing their contacts and applying the power source to the motor 30 so that the motor operates in a first direction to extend the glove box bin 28. The motor is energized as long as the push button switch 46 is held applying the power to voltage divider. Releasing push button switch 46 removes power from the relay coils de-energizing the relays causing the relay contacts to open to interrupt power flow to the motor. When power flow is interrupted, the glove box bin stops moving immediately so that the bin can be partially opened. The second push button switch 48 is similar to push button switch 46 except that its voltage divider delivers power to the relay coils for relays $R_2$ and $R_4$ which have normally open relay contacts. Relays $R_2$ and $R_4$ connect power to the motor when operated but with opposite polarity so that the motor operates in the reverse direction to retract the globe box bin. The bin can be partially retracted by releasing the second push button switch 48 so that power flow to the motor is interrupted.

Figure 4:
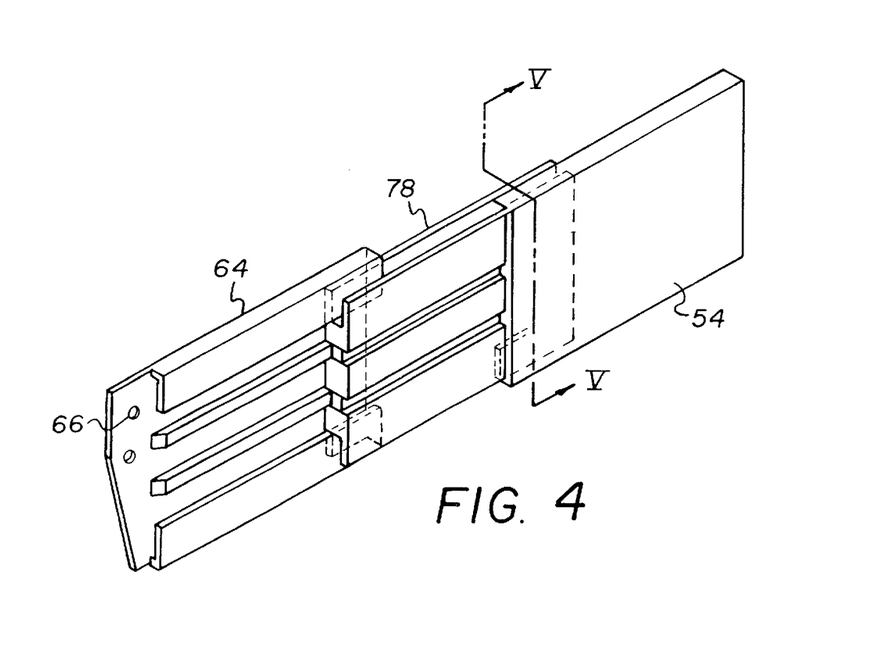
FIG. 4 is a perspective view of the right side brace of the glove box of FIG. 1 shown extended.
Figure 5:
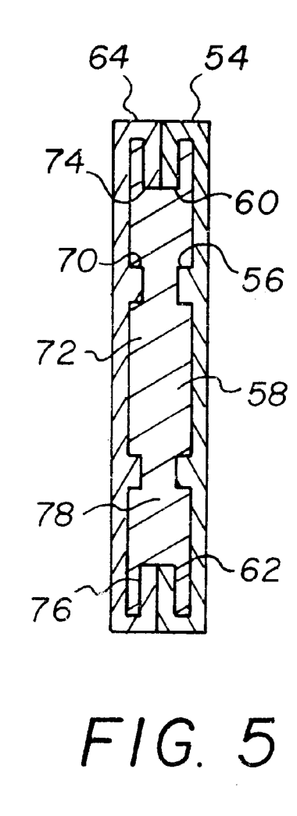
FIG. 5 is a sectional view of the side brace taken along line V—V of FIG. 4 when the side brace is retracted.
Figure 9:
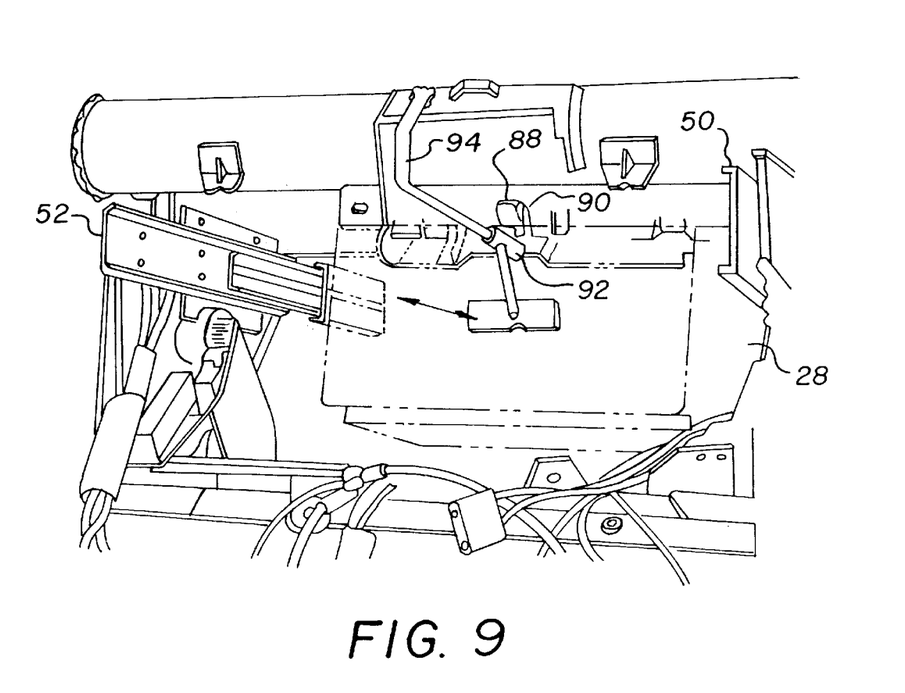
FIG. 9 is a diagrammatic rear view of a glove box similar to the glove box of FIG. 1, but illustrating another preferred embodiment.

Referring now to FIGS. 4, 5 and 9, the glove box bin 28 is removably connected to left and right side braces 50, 52. The left and right side braces 50, 52 are identical except that the left side brace is on the left side of the bin and the right side brace is on the right side of the bin. Only the left side brace will be described in detail. Left side brace 50 has first section 54 fastened to the vehicle framework, preferably to the vehicle frame cross member 24 or to a bracket fastened to the cross member 24. Alternatively, the first section 54 of the left side brace 50 may be fastened to the left side frame member 16. As illustrated, the first section 54 has an overall reverse or backward "C" configuration with an interior surface defining at least one land 56 and at least one groove 58. Preferably, there are a plurality of lands and grooves. In addition, the first section 54 contains a top land 60 and a bottom land 62 that extend toward one another forming the extremities of the backward "C". Left side brace 50 supports the bin box and helps prevent twisting of the box. Left side brace 50 may be constructed of metal but may be extruded plastic as well.

The left side brace 50 also includes a second section 64 containing at least one opening 66 for receiving a push button release 68 that connects the bin box 28 to the second section 64 and thus to the left side brace 50. When connected by the push button release 68, the bin 28 and second section 64 move together in concert. The second section 64 has an overall "C" configuration with an interior surface defining at least one land 70 and at least one groove 72. The second section also has a top land 74 and a bottom land 76 that extend toward one another and form the extremities of the "C".

As illustrated, a third section 78 is intermediate the first and second sections 54, 64 of the left side brace 50 and nests therewith in a retracted position and extends between the first and second sections in an extended position. The third section contains a left side face that faces the second section 64 and a right side face facing the first section 54. The left side face contains lands and grooves mateable with the lands and grooves of the second section 64, while the right side face contains lands and grooves mateable with the lands and grooves of the first section 54. The third section has a top edge face defining a groove between left and right lands for receiving the top lands 60, 74 of the first and second sections 54, 64, respectively. Similarly, the third section 78 contains a bottom edge face defining a groove between left and right bottom lands for receiving the bottom lands 62, 76 of the first and second sections 54, 64 of the left side brace. The first section top and bottom lands extend toward one another and ride in the top and bottom grooves, respectively, of the third section inboard of the second section top and bottom lands.

Each of the three sections 54, 64, 78 always overlap the section to which it connects in a telescoping manner. The telescoping action helps prevent twisting of the braces and helps support the brace assembly.

Figure 8:
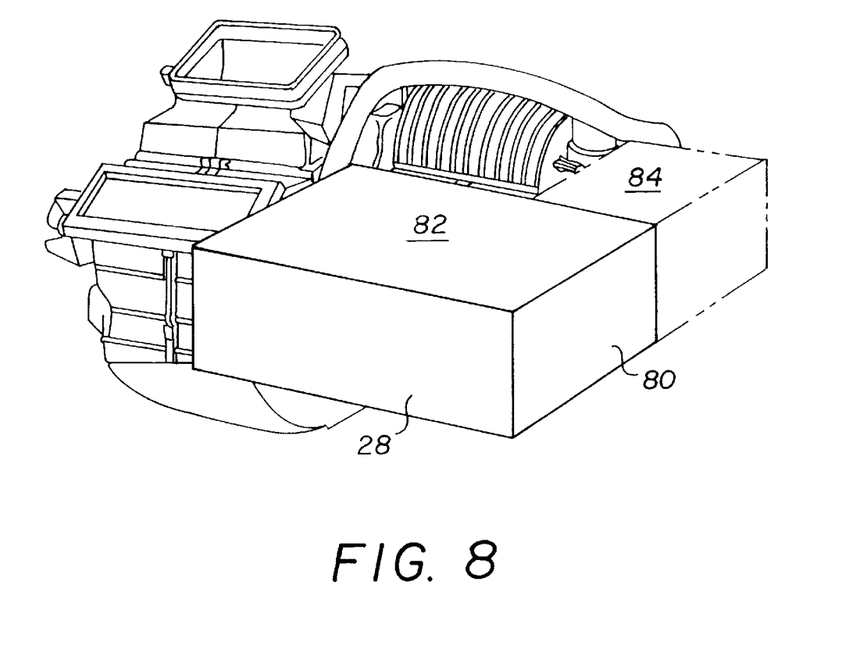
FIG. 8 is a diagram illustrating the shape and increased volume of a glove box.

Referring now to FIG. 8, glove box bin 28 has a bottom 80 with first and second adjoining rectangular areas 82, 84 in a rotated 'L' configuration with the area of the small leg of the 'L' 84 equal to about ten to forty percent of the area of the large leg of the 'L' 82. Glove box bin 28 has a bottom area and height of a size sufficient for holding eighteen upright beverage cans. While the particular configuration may vary according to the vehicle model and equipment installed, there is a ten to forty percent volume increase in the glove box.

Operating push button 68 releases bin 28 from braces 50, 52 so that the bin can be removed. Removal is desirable to transport items in the bin or to replace one bin with another bin. With the bin removed, the door can close to act as a knee bolster. For vehicles equipped with front passenger air bags, the removable bin makes air bag servicing easier.

Figure 10:
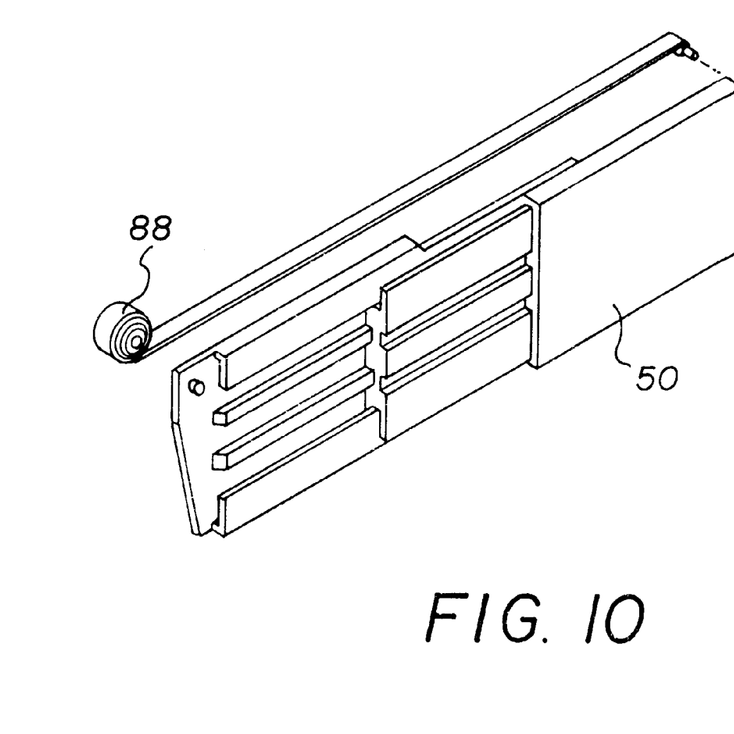
FIG. 10 is a diagrammatic side view similar to FIG. 4 but illustrating another preferred embodiment.

FIGS. 9–10 illustrate an alternative to the motor driven bin. The bin is driven by a spring, such as coil spring 88. Coil spring 80 is at rest when the glove box is extended, and when the bin is pushed in to close it, the spring is forced to wind or load for the next opening operation. Retracting the bin stretches out the spring and the door or a latch holds the bin in place. Opening the door allows the bin to extend so that it can be removed. The bin thus moves in and out under the power of the spring without the need for an electric motor. Preferably, there are two springs, one near either side of the bin for even opening and closing of the glove box.

FIG. 9 illustrates a centrally positioned coil spring 88 having a fixed end connected to a bracket 90 fastened to the vehicle framework or glove box frame. The free end of spring 88 is connected to a push arm 92 that has a portion engaging the rear of the bin box and a portion riding on a following bar 94 fastened to the vehicle framework. As illustrated, the door is open with the bin extended so that spring 88 is relaxed or wound, and push arm 92 is pulled forward by the action of spring 88 as it winds. When the door is closed, the bin is pushed in to its retracted position causing push arm 92 to ride up following bar 94 and spring 88 unwind thereby loading the spring creating spring tension to extend the bin when the door is again opened.

Alternatively, a linear coil spring could be positioned about the following bar 94 to bias push arm 92 forward to extend the bin. Closing the door would compress the spring readying it for the next opening operation.

It will be now appreciated that there has been presented a glove box for a vehicle. The glove box includes a left side brace having a first section fastened to the frame and a second section connected to the first section and slidably movable between a retracted position at which the second section nests with the first section and an extended position at which the second section extends from the first section. It also includes a right side brace having a first section fastened to the frame and a second section connected to the first section and slidably movable between a retracted position at which the second section nests with the first section and an extended position at which the second section extends from the first section, a bin removably mounted between the left and right braces, and control means for controllably extending and retracting the second sections of the braces to extend and retract the bin.

Each side brace includes a third section with a first face defining a first groove and a second face defining a second groove. The first section has a face defining lands engaging the grooves of the third section, and the second section defines lands engaging the grooves of the third section. The third section is intermediate the first and second sections and nests therewith and operates in a telescoping manner. Each side brace includes a third section having first and second side faces each defining lands and grooves and top and bottom edge faces each defining a groove between first and second lands.

The first section has a surface defining lands and grooves wherein the lands of the first section ride in the grooves of the third section, and the lands of the third section ride in the grooves of the first section. The first section top and bottom lands extend toward one another and ride in the top and bottom grooves of the third section inboard of the second section top and bottom lands.

The second section has a surface defining lands and grooves wherein the lands of the second section ride in the grooves of the third section, the lands of the third section ride in the grooves of the second section, and the second section top and bottom lands extend toward one another and ride in the top and bottom grooves of the third section inboard of the first section top and bottom lands. This interlocking structure minimizes twisting of the braces for smooth, even operation.

The bin has left and right openings alignable with the openings of the left and right second sections for receiving push buttons. The push buttons engage the openings to mount the bin and disengage to release the bin for removal from the braces.

The control means includes a gear rack mounted on the glove box bin, an electric motor having a drive gear engaging the gear rack, and an electric circuit to energize the motor to controllably extend and retract the glove box bin. The electric circuit includes a switch mounted on the instrument panel operable at a first position to operate the motor in forward direction to controllably extend the bin and operable at a second position to operate the motor in a reverse direction to controllably retract the bin. The bin moves only when the switch is operated and ceases movement when the switch is released so that the bin may be partially extended and retracted. The control means may include a spring that acts on one of the bin and braces to bias the bin toward its extended position instead of an electric motor.

Operation of the present invention is believed to be apparent from the foregoing description and drawings, but a few words will be added for emphasis. The vehicle operator pushes and holds the first push button switch which energizes relays to apply power to the motor causing the motor to extend or open the glove box. As the glove box opens the bin moves straight out and the door swings down out of the way. When the push button is released, the bin stops moving whether it is fully open or partially open. Further operation of the first push button will fully extend the bin. Pushing and holding the second push button causes the motor to operate in the reverse direction causing the bin to retract. When the second push button is released, the bin stops moving whether it is fully closed or partially closed. Further operation of the second push button will fully close the bin. Because the door is out of the way, the contents of the bin are easily accessible. The bin can be removed with its contents for transport, or the bin can be replaced with another bin of different size or footprint. Where opening energy is provided by a spring, a panel mounted push button can release the door so that the bin can extend and retract.

The present invention provides a bin that moves straight out from the instrument panel. It can be removed and replaced with an alternate usage bin. The door can swing down under the bin, or the door can be part of the bin forming a front portion of the bin. The present invention provides increased storage space and allows use of space that would be filled with the door, and a bin that tilts out with limited travel. This is accomplished by braces on either side of the glove box that allow for tolerance build and twist. Each brace is of a telescoping design that allows for maximum support of the bin at all times. A feature of the invention is that of the bin being capable of removal and replacement with a bin of a different size or configured to hold different items. The glove box design offers a removable glove box bin that takes advantage of all the package space available, adapts to differently designed or alternative usage glove boxes, and resists twisting.

While the invention has been described with reference to the preferred embodiments, it will be understood by those skilled in the art that various changes may be made and equivalents may be substituted for elements of the preferred embodiment without departing from invention. For example, other circuits may be used to control the motor to operate the glove box. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, the braces are illustrated as containing three sections but there can be two section braces and brace with more than three sections. Also, the braces can be constructed of metal or can be constructed of high density plastic and fabricated by extrusion. It is accordingly intended that the claims shall cover all such modifications and applications as do not depart from the true spirit and scope of the invention.

What is claimed is:

1. A glove box for a vehicle, said vehicle having a vehicle frame cross member, said glove box, comprising:

a glove box frame;

a left side brace having a first section fastened to said vehicle frame cross member and a second section connected to said first section and slidably movable between a retracted position at which said second section nests with said first section and an extended position at which said second section extends from said first section;

a right side brace having first section fastened to said vehicle frame cross member and a second section connected to said first section and slidably movable between a retracted position at which said second section nests with said first section and an extended position at which said second section extends from said first section;

a bin supported on said glove box frame and removably mounted between said left and right braces; and control means for controllably extending and retracting said second sections of said braces to extend and retract said bin.

2. A glove box, as set forth in claim 1, wherein said bin contains left and right push buttons and wherein said left and right second sections each contain an opening, said push buttons engaging said openings to mount said bin and disengaging to release said bin for removal from said braces.

3. A glove box, as set forth in claim 1, wherein said bin has a bottom with an area of a size sufficient for holding eighteen standard soft drink beverage cans upright.

4. A glove box, as set forth in claim 1, wherein said bin has a bottom with first and second adjoining rectangular areas in a rotated 'L' configuration with the area of the small leg of the 'L' equal to about ten to forty percent of the area of the large leg of the 'L'.

5. A glove box, as set forth in claim 1, wherein each of said left and right side braces include a third section with a first face defining a first groove and a second face defining a second groove, said first section having a face defining a land engaging said first groove of said third section, said second section defining a land engaging said second groove of said third section, said third section being intermediate said first and second sections and nesting therewith in a retracted position and extending between said first and second sections in an extended position.

6. A glove box, as set forth in claim 1, wherein each of said left and right side braces include a third section having a first and second side faces with each of said first and second side faces defining a land and groove, said third section having a top and bottom edge faces with each of said top and bottom edge faces defining a first and second lands with a groove between said first and second lands.

7. A glove box, as set forth in claim 6, wherein said first section has a surface defining a land and a groove, said land of said first section riding in said groove of said first side face of said third section, said land of said first side face of said third section riding in said groove of said first section, and wherein said first section has a top and bottom lands that extend toward one another and ride in said top and bottom grooves of said top and bottom edge faces, respectively, of said third section.

8. A glove box, as set forth in claim 6, wherein said second section has a surface defining a land and a groove, said land of said surface of said second section riding in said groove of said second side face of said third section, said land of said surface of said third section riding in said groove of said second side face of said second section, said second section having a top and bottom lands extending toward one another and riding in said top and bottom grooves of said top and bottom edge faces, respectively, of said third section.

9. A glove box, as set forth in claim 1, wherein said control means includes a spring acting on one of said bin and braces to bias said bin toward its extended position.

10. A glove box, as set forth in claim 1, wherein said control means includes:

a gear rack mounted on said bin;

an electric motor having a drive gear engaging said gear rack; and an electric circuit to controllably energize said motor to extend and retract said bin.

11. A glove box, as set forth in claim 1, wherein said control means includes;

a bracket fastened to one of said vehicle frame cross member and glove box frame;

a following bar fastened to said vehicle frame cross member;

a push arm riding on said following bar and engaging a rear portion of said bin; and a spring having a fixed end connected to said bracket and a free end connected to said push arm to bias said bin toward its extended position.

12. A glove box for a vehicle, said vehicle having a vehicle frame cross member, said glove box comprising:

a glove box frame;

a left side brace and a right side brace, each of said braces having a first, second and third sections with said first section being fastened to said vehicle frame cross member, said second section being connected to said first section and slidably movable relative to said first section between a retracted position at which said second section nests in said first section and an extended position at which said second section extends from said first section, said third section being connected to said second section and slidably movable relative to said second section between a retracted position at which said third section nests in said second section and an extended position at which said third section extends from said second section;

a bin supported on said above box frame and removably mounted between said left and right braces; and control means for controllably extending and retracting said second and third sections of said braces to extend and retract said bin.

13. A glove box, as set forth in claim 12, wherein said control means includes a spring acting on one of said bin and braces to bias said bin toward its extended position.

14. A glove box, as set forth in claim 12, said control means includes:

a gear rack mounted on said bin;

an electric motor having a drive gear engaging said gear rack; and an electric circuit to controllably energize said motor to extend and retract said bin.

15. A glove box, as set forth in claim 14, wherein said electric circuit includes a switch mounted on said instrument panel operable at a first position to operate said motor in forward direction to extend said bin and operable at a second position to operate said motor in a reverse direction to retract said bin, said bin moving only when said switch is operated and ceasing movement when said switch is released so that said bin may be partially extended and retracted.

16. A glove box, as set forth in claim 12, wherein each of said second sections has a first and second side faces with each of said first and second side faces defining a land and groove, and wherein each of said second sections has a top and bottom edge faces with each of said top and bottom edge faces defining a first and second lands with a groove between said first and second lands.

17. A glove box, as set forth in claim 16, wherein each of said first sections has a surface defining a land and a groove, said land of said first section riding in said groove of said first side face of said section, said land of said first side face of said second section riding in said groove of said first section, and wherein said first section has a top and bottom lands that extend toward one another and respectively ride in said top and bottom grooves of said top and bottom edge faces.

18. A glove box, as set forth in claim 16, wherein said third section has a surface defining a land and a groove, said land of said surface of said third section riding in said groove of said second side face of said second section, said land of said second side face of said second section riding in said groove of said surface of said third section, said top and bottom lands of said top and bottom edge faces of said third section extending toward one another and respectively riding in said top and bottom grooves of said top and bottom edge faces of said third section.

19. A glove box, as set forth in claim 12, wherein said control means includes;
   a bracket fastened to one of said vehicle frame cross member and glove box frame;
   a following bar fastened to said vehicle frame cross member;
   a push arm riding on said following bar and engaging a rear portion of said bin; and
   a spring having a fixed end connected to said bracket and a free end connected to said push arm to bias said bin toward its extended position.

20. A glove box for a vehicle, said vehicle having a vehicle frame cross member, said glove box comprising:
   a glove box frame having a first side frame member with a top portion, a second side frame member with a top portion and being spaced from said first side frame member, a first track support fastened to said vehicle frame and attached to said top portion of said first side frame member, a second track support fastened to said vehicle frame and attached to said top portion of said second side frame member, a first cross member connecting said first and second track supports, a second cross member spaced from said first cross member and connecting said first and second track supports, and a third cross member connecting said first and second side frame members;
   a left side brace and a right side brace, each of said braces having a first, second and third sections with said first section being fastened to said vehicle frame cross member, said second section being connected to said first section and slidably movable relative to said first section between a retracted position at which said second section nests in said first section an extended position at which said second section extends from said first section, said third section being connected to said second section and slidably movable relative to said second section between a retracted position at which said third section nests in said second section and an extended position at which said third section extends from said second section;
   a bin removably mounted between said left and right braces, said second and third sections of said braces extending and retracting to extend and retract said bin;
   a bracket fastened to one of said vehicle frame and glove box frame;
   a following bar fastened to said vehicle frame;
   a push arm riding on said following bar and engaging a rear portion of said bin; and
   a spring having a fixed end connected to said bracket and a free end connected to said push arm to bias said bin toward its extended position.

* * * * *